Patented Jan. 15, 1935

1,988,363

UNITED STATES PATENT OFFICE 1,988,363

PROCESS OF RECOVERING FIBER FROM WASTE PAPER

Francis H. Snyder, New York, N. Y., assignor to Snyder Maclaren Processes, Inc., New York, N. Y., a corporation of Delaware No Drawing. Application October 31, 1933, Serial No. 696,114

16 Claims. (Cl. 92—9)

This invention relates to a process of recovering fiber from waste paper, and more particularly to a process of deinking waste paper such as newsprint, bookprint, old magazine stock and the like.

The principal object of this invention is to provide a simple, economical, and commercially practicable process of converting waste paper of the above referred to character into a high grade of pulp.

An important object of the invention is to provide a process of deinking waste paper wherein relatively hard water may be satisfactorily used as a medium for providing a suspension of the waste paper during the deinking operation.

Another object of the invention is to provide a process of deinking waste paper which is simple in operation and requires a relatively short period for effective deinking.

Other objects and advantages of the invention will become apparent during the course of the following description.

I have discovered that printed waste paper, such as old newsprint, bookprint, magazine stock and the like, can be rapidly and effectively deinked and a superior quality of white pulp obtained therefrom by subjecting such waste paper in wet pulp form to the action of a fatty alcohol having more than 8 carbon atoms, or certain compounds or derivatives of such fatty alcohols. In the practice of the process the waste paper in dilute aqueous suspension is subjected to a mechanical beating action in the presence of a small proportion of the fatty alcohol or compound or derivative thereof, the alcohol preferably being used in conjunction with a mild alkali, or a mild alkali and soap, after which treatment the fibers are separated from the deinking solution and thoroughly washed.

In the preferred practice of my process, I employ a fatty alcohol having more than 8 carbon atoms, such as lauryl alcohol, cetyl alcohol, undecyl alcohol or the like. Providing the fatty alcohol contains more than 8 carbon atoms, it may be unsaturated, straight chain, or branch chain fatty alcohol. These alcohols are insoluble in water but since they reduce the surface tension of water to a very great extent, they go into permanent suspension, even in sea water or the hardest of natural waters. They are not affected at all by hardness and a heavy lather can be obtained with these fatty alcohols even in lime water. Alcohols which are readily soluble in water are not suitable for use in the practice of my process, nor are the polyhydric alcohols, such as glycerine.

In place of the fatty alcohols themselves, I may advantageously employ in the practice of the present invention half-esters of fatty alcohols having more than 8 carbon atoms, or alkali-metal salts thereof. For example I may use half-esters having the type formula RHX, wherein R represents a hydrocarbon group, such as an alkyl group, H represents hydrogen, and X represents an acid radical, such as a sulfate, oxalate, phosphate, or tartrate radical or the like, but preferably a mineral acid radical. A specific example of this type of reagent which I may satisfactorily use is lauryl acid sulfate ester, or an alkali-metal salt thereof such as its sodium salt.

Other derivatives of fatty alcohols having more than 8 carbon atoms which I may use in the practice of the present process are the reaction products of the fatty alcohols with soluble salts of amphoteric metal acids, such as soluble silicates, phosphates, borates and the like. These derivatives, which are solid detergents, may be readily obtained by mixing a fatty alcohol having more than 8 carbon atoms with an approximately molecular proportion of a soluble salt of an amphoteric metal acid. For example, the reaction product of lauryl alcohol with sodium silicate has been found to be a very suitable detergent for use in the present invention.

In employing detergents of the above referred to character I have found it advantageous to use them with mild alkalis, such as sodium bicarbonate, soda ash, or even a dilute caustic soda solution. If desired, soap or other conventional detergent may also be used with the fatty alcohol detergent of the above referred to character, preferably in conjunction with a mild alkali.

In practicing the present process, the waste paper to be deinked is preferably first subdivided into relatively small pieces, as by passing the waste paper through a conventional shredding machine. The exact size of the pieces is not material, it merely being advisable to so subdivide the waste paper as to avoid the presence in the mass of thick bulky masses which might damage the beater in which the waste paper is subsequently treated. If the waste paper contains extraneous matter, as is generally the case, it is also advisable to subject the waste paper to a mechanical cleaning action, as in a conventional duster.

After the paper has been shredded and initially cleaned, if these have been found to be desirable steps, it is introduced into an aqueous medium in an operating beater engine in such an amount as to provide a dilute liquid suspension, say a suspension of approximately from 3 to 4 per cent. solid content. Before the waste paper is introduced into the water or other aqueous medium, it is preferable to dissolve a suitable alkali therein to provide a mildly alkaline solution. Also, if soap is to be employed, which in some instances is desirable but not necessary, this may also be initially added and thoroughly mixed in the aqueous medium.

After the waste paper has been added to the aqueous medium in the beater, it is preferable to operate the beater for a short period in order to distribute the fibrous material more-or-less uniformly throughout the mass. Thereupon, a small amount of a fatty alcohol having more than 8 carbon atoms or one or more of the derivatives referred to above is then added to the beater and the mass is beaten for several hours, after which the treating solution is drained off the fibrous material, and the resulting fibers are washed. The amount of fatty alcohol or derivatives to be employed is quite small and will vary somewhat according to the particular compound used, the hardness of the water, the other reagents present, etc. However, a simple test of whether sufficient detergent has been added is to note whether a stable froth has been formed on the surface of the mass in the beater. The addition of a sufficient amount of detergent will cause the production of a very stable froth.

The following typical example will be found to be illustrative of the present invention:

One ton of waste paper is shredded and dusted. Thereafter, the shredded paper is introduced into a beater containing from 25 to 30 tons of water in which has been dissolved approximately 200 pounds of sodium bicarbonate. After running the beater to thoroughly mix the pulp in the alkaline solution, from 2 to 10 pounds of lauryl alcohol are then added. The mass is then either beaten for two or three hours in the beater or, as is preferable, is beaten in the beater for about one hour and then passed through an attrition machine such as a Weiner refiner, rod mill or the like. Thereafter, the fibrous material is separated from the liquid present and the resulting fibers are washed. The separation and washing of the fibrous material can be advantageously accomplished by passing the mass from the beater to a conventional decker washer and treating the fiber with a considerable excess of water, in the conventional manner. The washed fibers may then be delivered directly to the beater of a paper machine or may be formed into pulp laps for shipment as desired.

While I have described in detail the preferred embodiment of my invention it is to be understood that the details of procedure may be variously modified without departing from the spirit of the invention or the scope of the subjoined claims.

I claim:

1. In a process of reclaiming fiber from waste paper the step which comprises subjecting the waste paper in wet pulp form to the action of a deinking composition comprising a reagent selected from the group consisting of fatty alcohols having more than 8 carbon atoms, half-esters of such fatty alcohols, alkali-metal salts of such half-esters, and reaction products of such alcohols with alkali-metal salts of amphoteric metal acids.

2. In a process of reclaiming fiber from waste paper the step which comprises subjecting the waste paper in wet pulp form to the action of a deinking reagent comprising a fatty alcohol having more than 8 carbon atoms.

3. In a process of reclaiming fiber from waste paper the step which comprises subjecting the paper in wet pulp form to the action of lauryl alcohol.

4. In a process of reclaiming fiber from waste paper the step which comprises subjecting the waste paper in wet pulp form to the action of a deinking composition comprising a half-ester of a fatty alcohol having more than 8 carbon atoms.

5. In a process of reclaiming fiber from waste paper the step which comprises subjecting the waste paper in wet pulp form to the action of a deinking reagent comprising a half-ester of a fatty alcohol having more than 8 carbon atoms and having the general formula RHX, wherein R is a hydrocarbon group, H is hydrogen, and X is a mineral acid radical.

6. In a process of reclaiming fiber from waste paper the step which comprises subjecting the waste paper in wet pulp form to the action of a deinking reagent comprising the reaction product of a fatty alcohol having more than 8 carbon atoms with an alkali-metal salt of an amphoteric metal acid.

7. The process of reclaiming fiber from waste paper which comprises subjecting the waste paper in dilute aqueous suspension to a mechanical beating action in the presence of an alkaline agent and a reagent selected from the group consisting of fatty alcohols having more than 8 carbon atoms, half-esters of such fatty alcohols, alkali-metal salts of such half-esters, and reaction products of such fatty alcohols with alkali-metal salts of amphoteric metal acids, and recovering and washing the thus treated fibrous material.

8. The process of reclaiming fiber from waste paper which comprises subjecting the waste paper in dilute aqueous suspension to a mechanical beating action in the presence of an alkaline agent and a fatty alcohol having more than 8 carbon atoms, and recovering and washing the thus treated fibrous material.

9. The process of reclaiming fiber from waste paper which comprises subjecting the waste paper in dilute aqueous suspension to a mechanical beating action in the presence of an alkaline agent and lauryl alcohol, and recovering and washing the thus treated fibrous material.

10. The process of reclaiming fiber from waste paper which comprises subjecting the waste paper in dilute aqueous suspension to a mechanical beating action in the presence of an alkaline agent and a half-ester of a fatty alcohol having more than 8 carbon atoms, and recovering and washing the thus treated fibrous material.

11. The process of reclaiming fiber from waste paper which comprises subjecting the waste paper in dilute aqueous suspension to a mechanical beating action in the presence of an alkaline agent and a reagent comprising a half-ester of a fatty alcohol having more than 8 carbon atoms and having the general formula of RHX, wherein R is a hydrocarbon group, H is a hydrogen, and X is a mineral acid radical, and recovering and washing the thus treated fibrous material.

12. The process of reclaiming fiber from waste paper which comprises subjecting the waste paper in dilute aqueous suspension to a mechanical beating action in the presence of an alkaline agent and the reaction product of a fatty alcohol having more than 8 carbon atoms with an alkali-metal salt of an amphoteric metal acid, and recovering and washing the thus treated fibrous material.

13. The process of reclaiming fiber from waste paper which comprises subjecting the waste paper in dilute aqueous suspension to a mechanical beating action in the presence of an alkaline agent and the reaction product of a fatty alcohol having more than 8 carbon atoms with sodium silicate, and recovering and washing the thus treated fibrous material.

14. The process of reclaiming fiber from waste paper which comprises subjecting the waste paper in dilute aqueous suspension to a mechanical beating action in the presence of an alkaline agent and a fatty alcohol derivative comprising the reaction product of lauryl alcohol with sodium silicate, and recovering and washing the thus treated fibrous material.

15. The process of reclaiming fibrous material from waste paper which comprises subjecting the waste paper in dilute aqueous suspension to a mechanical beating action in the presence of a deinking composition comprising an alkaline agent, soap, and a reagent selected from the group consisting of fatty alcohols having more than 8 carbon atoms, half-esters of such fatty alcohols, alkali-metal salts of such half-esters, and reaction products of such alcohols with alkali-metal salts of amphoteric metal acids, and recovering and washing the thus treated fibrous material.

16. The process of reclaiming fiber from waste paper which comprises subdividing the waste paper, mechanically beating the waste paper in suspension in a weak alkaline solution in the presence of a reagent selected from the group consisting of fatty alcohols having more than 8 carbon atoms, mineral acid half-esters of such fatty alcohols, sodium salts of such half-esters, and derivatives comprising the reaction products of such alcohols with alkali-metal salts of amphoteric metal acids, and recovering and washing the thus treated fibrous material.

FRANCIS H. SNYDER.